US008234591B1

(12) United States Patent
Dhawan et al.

(10) Patent No.: US 8,234,591 B1
(45) Date of Patent: Jul. 31, 2012

(54) UNDO AND REDO USING THUMBNAILS GENERATED FROM A SPECIFIC AREA OF THE IMAGE

(75) Inventors: Anmol Dhawan, Ghaziabad (IN); Sachin Soni, Delhi (IN); Sachin Gaur, Ghaziabad (IN); Ganesh Sahai, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 908 days.

(21) Appl. No.: 11/751,632

(22) Filed: May 21, 2007

(51) Int. Cl.
*G06F 3/048* (2006.01)
(52) U.S. Cl. ......................................... 715/838; 715/825
(58) Field of Classification Search .................. 715/738, 715/732, 764, 838, 825
See application file for complete search history.

(56) References Cited

U.S. PATENT DOCUMENTS

| 5,898,436 | A |  | 4/1999 | Stewart et al. |
| 6,456,307 | B1 | * | 9/2002 | Bates et al. ................... 715/838 |
| 6,870,547 | B1 |  | 3/2005 | Crosby et al. |
| 6,964,025 | B2 |  | 11/2005 | Angiulo et al. |
| 7,062,497 | B2 | * | 6/2006 | Hamburg et al. ..................... 1/1 |
| 7,239,328 | B2 | * | 7/2007 | Boler et al. .................... 345/619 |
| 2005/0055624 | A1 | * | 3/2005 | Seeman et al. ................ 715/500 |
| 2005/0097475 | A1 | * | 5/2005 | Makioka et al. .............. 715/792 |
| 2006/0224997 | A1 | * | 10/2006 | Wong et al. ................... 715/838 |
| 2007/0094611 | A1 | * | 4/2007 | Sasaki ........................... 715/804 |
| 2007/0118818 | A1 | * | 5/2007 | Gunderson et al. ........... 715/838 |

OTHER PUBLICATIONS

GNU Image Manipulation Program. Available at: http://web.archive.org/web/20060221062823/http://docs.gimp.org/en/gimp-undo-dialog.html.*

"GNU Image Manipulation Program", Rev. 2.2; Dec. 19, 2004, downloaded from http://docs.gimp.org/en/gimp-undo-dialog.html, 2 pages.

* cited by examiner

*Primary Examiner* — Omar Abdul-Ali
(74) *Attorney, Agent, or Firm* — Robert C. Kowert; Meyertons, Hood, Kivlin, Kowert & Goetzel, P.C.

(57) ABSTRACT

A method and system for generating a first thumbnail of the image, one or more second thumbnails corresponding to at least one edit operation on a section of the image and identifying the one or more second thumbnails with respect to at least one of the first thumbnail, and/or the image, is disclosed. Embodiments of the invention also relate to displaying the thumbnails so generated.

17 Claims, 10 Drawing Sheets

UNDO AND REDO USING THUMBNAILS GENERATED FROM A SPECIFIC AREA OF THE IMAGE

BACKGROUND

1. Technical Field

Embodiments of the invention relate generally to thumbnails and more particularly to generating thumbnails in editing images.

2. Prior Art

Image-editing software tools such as Adobe® Photoshop® allow users to make use of thumbnails for speedy editing of the images. Thumbnails are typically small, low-resolution versions of images used for quick identification of the images. In existing photo-editing tools, typically, a list of names of edit operations and corresponding icons is displayed. By looking at this list, a user can select an icon from the list to pick a specific item in the list to go to a particular state of the image. Thus, a user may perform a particular edit operation on an image, for example draw a line on the image. Other operations such as 'undo' and 'redo' are used so that the edit operation need not be repeated for obtaining a specific version of the image.

However, in existing photo-editing tools, the small size of the thumbnail makes it difficult to discern changes made in the image. For example, if a user repeatedly performs similar edit operations, for example uses an 'ink tool' on different sections of the image in Adobe® Photoshop®, then it becomes difficult to identify as to which thumbnail corresponds to which edit operation, from the list of thumbnails of the image.

SUMMARY

Embodiments of the invention described herein provide a computer-implemented method, system and computer program product for generating thumbnails for an image.

In accordance with an embodiment of the invention, a method for generating thumbnails for an image is provided. The method includes generating a first thumbnail of the image, generating one or more second thumbnails corresponding to at least one edit operation on a section of the image, and identifying the one or more second thumbnails with respect to at least one of the first thumbnail, and the image.

In accordance with an embodiment of the invention, a method for generating thumbnails is provided. The method includes generating a first thumbnail of the image, selecting a section of the image based on an edit operation on the section, generating a second thumbnail of the section, generating the second thumbnail, and identifying the second thumbnail with respect to at least one of the first thumbnail, and the image.

Other embodiments of the invention may be used in products such as Adobe® Photoshop®.

This summary is not intended to describe each embodiment of the invention. The Detailed description and Figures that follow provide additional aspects of embodiments of the invention.

DETAILED DESCRIPTION OF THE EMBODIMENTS

Embodiments of the invention provide a method, system and computer program product for generating thumbnails for an image. The image is edited using image-editing software tools such as Adobe® Photoshop®. The method for generating thumbnails includes generating a first thumbnail of the image. One or more second thumbnails are then generated. The second thumbnails correspond to at least one edit operation on a section of the image. Drawing a line on the image resulting in a change in the image is representative of an edit operation. The section of the image refers to a minimum rectangular area that includes the change in the image due to one or more edit operations. It will be appreciated that the section of the image may include any other shape besides a rectangular shape. The second thumbnails are identified with respect to at least one of the first thumbnail, and the image. The second thumbnails are then used for performing 'undo' and/or 'redo' operations on the image. Undo and redo operations are used in image-editing software tools so that similar or identical edit operations do not need to be repeated to obtain a specific version of the image.

Figure 1:
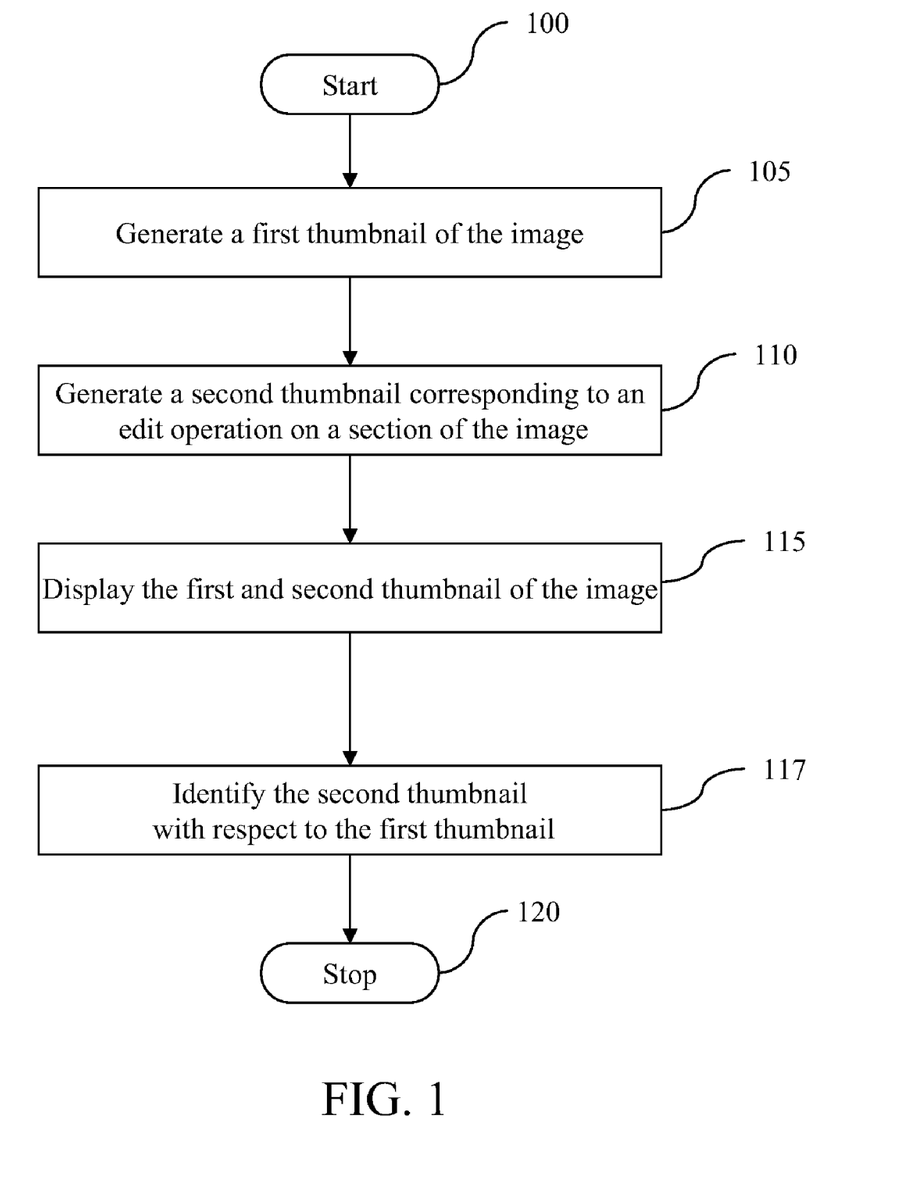
FIG. 1 is a flowchart illustrating the sequence of steps in generating thumbnails for an image in accordance with an embodiment of the invention.

FIG. 1 is a flowchart illustrating the sequence of steps in generating thumbnails for an image in accordance with an embodiment of the invention. Step 100 starts. Step 105 generates the first thumbnail of the image. Step 110 generates a second thumbnail corresponding to one or more edit operations on the section of the image. In one embodiment of the invention, the first thumbnail and the second thumbnail that corresponds to one or more edit operations on the section of the image are displayed. For explanatory purposes, the step 110 will be described with respect to an edit operation on the section of the image. It will be appreciated that multiple edit operations can be performed on the section of the image. In such a case, the second thumbnail is generated either upon completion of the edit operation, on or between the edit operations.

In an embodiment of the invention, multiple edit operations can be performed on the same section of the image. In such a case, the second thumbnail is generated upon completion of the edit operations, or in between the edit operations. Also multiple thumbnails may be displayed depending on user requirement. Step 115 displays the image of the first thumbnail and the second thumbnail. Step 117 identifies the second thumbnail with respect to the first thumbnail. Step 120 ends.

Figure 2:
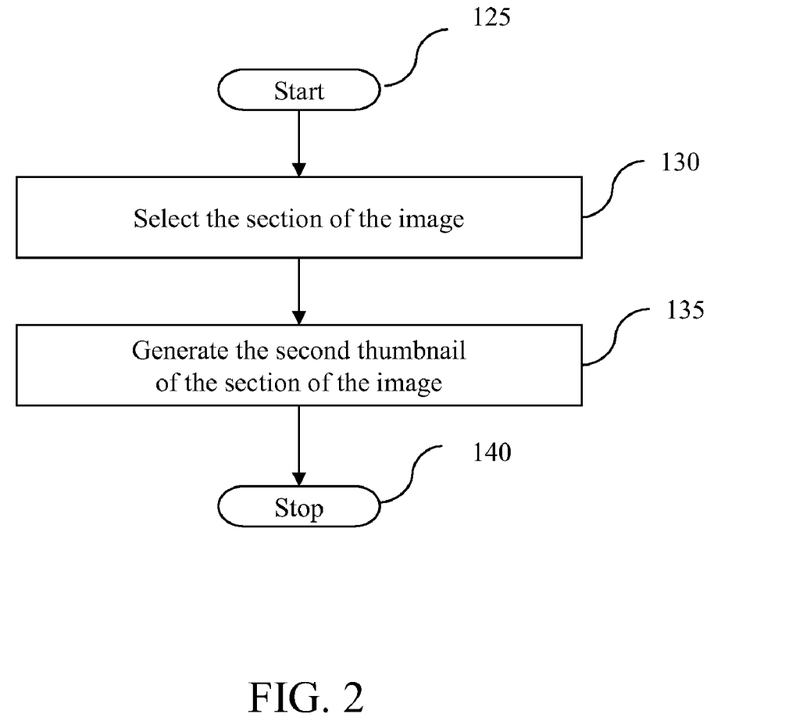
FIG. 2 is a flowchart illustrating the sequence of steps for an embodiment of the invention for generating a second thumbnail in accordance with an embodiment of the invention.

FIG. 2 is a flowchart illustrating the sequence of steps for an embodiment of the invention for generating a second thumbnail.

Step 125 starts. Step 130 selects the section of the image on which the edit operation is performed. Step 135 generates the second thumbnail from the section of the image. For example, for an image size of 200×200 pixels, a user may edit a section of the image represented by pixel size 30×30. In this instance, a minimal rectangular section that represents the section of the image on which the edit operation is applied, are selected from the image and shown as the second thumbnail. By doing this, the changes due to the edit operation on the image are clearly identified from the second thumbnail. In an embodiment of the invention, the second thumbnail is displayed in relation to the first thumbnail of the image.

In one embodiment of the invention, once the second thumbnail is generated, the second thumbnail is added to a list of thumbnails. The list is maintained by the image-editing software tool, and stored in a memory that interacts with the image-editing software tool. In one embodiment of the invention, for the purpose of display, the second thumbnail is retrieved from the memory in response to user command. Further, the image-editing software tool may display the list of thumbnails along with corresponding list of names of edit operations and icons. In another embodiment of the invention, the second thumbnail is identified on the image by generating a position of the section on the image.

Figure 3:
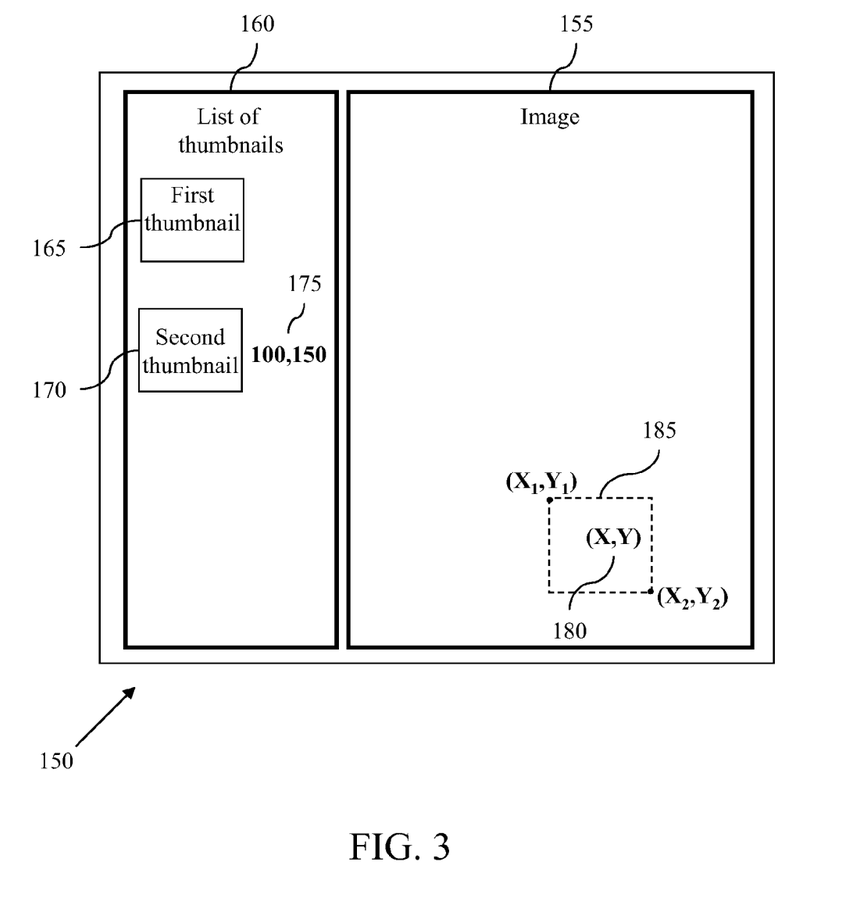
FIG. 3 is a block diagram illustrating a display of a position of a section on an image in accordance with an embodiment of the invention.

FIG. 3 is a block diagram illustrating the display 150 of the position of a section on an image in accordance with an embodiment of the invention. The display 150 includes the image 155, and the list of thumbnails 160. The list of thumbnails 160 includes the first thumbnail 165, and the second thumbnail 170. A numeric value of a location 175 of the section 185 (shown in dotted lines) of the image 155 with respect to the image 155 is displayed with the second thumbnail 170. It will be appreciated that the numeric value of the location 175 can be in pixels or points. The position 180 of the section 185 of the image 155 is shown, for example in X-Y co-ordinate values on the image 155. For example, the X-Y co-ordinate values on the image 155 are $(X_1, Y_1)$ and $(X_2, X_2)$, where $(X_1, Y_1)$ and $(X_2, Y_2)$ are top-left and bottom-right co-ordinates respectively of the section 185 of the image 155.

In another embodiment of the invention, the section 185 on the image 155 is shown as highlighted.

Figure 4:
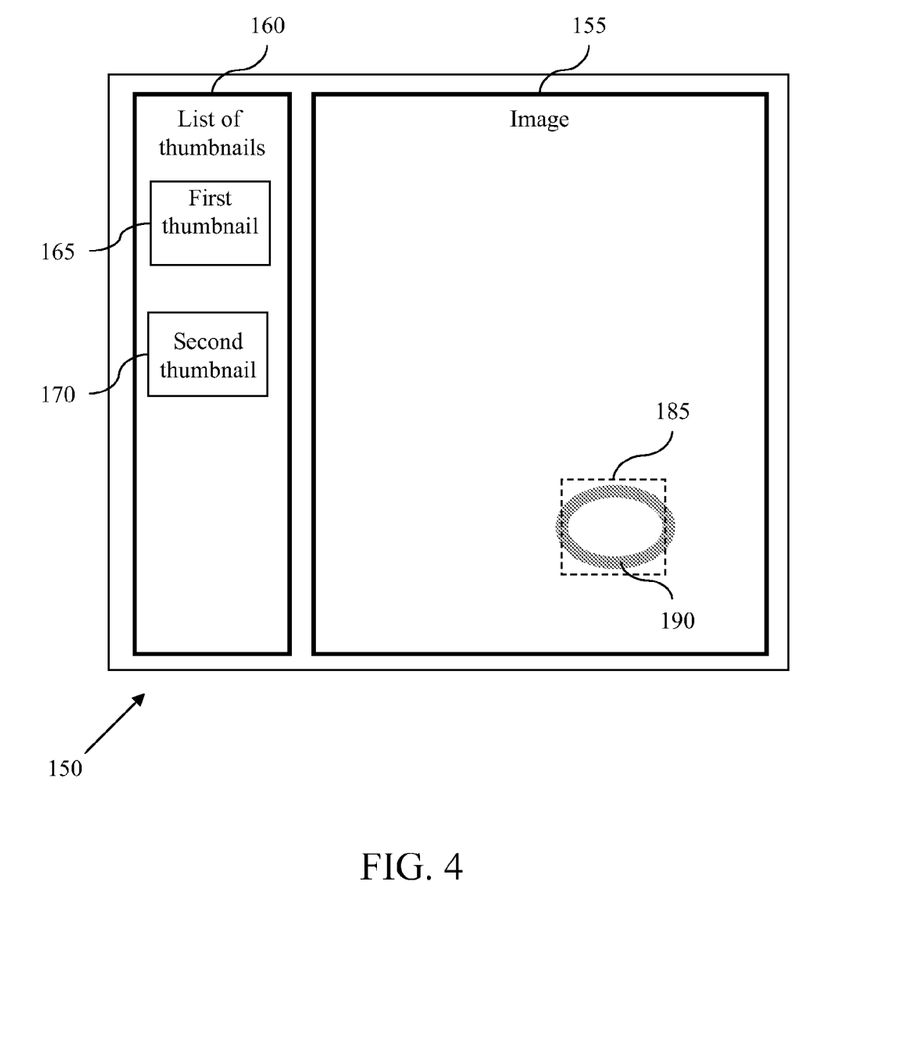
FIG. 4 is a block diagram illustrating an example display depicting a highlighted section in accordance with an embodiment of the invention.

FIG. 4 is a block diagram illustrating an example display 150 depicting a highlighted section 190 in accordance with an embodiment of the invention. The highlighted section 190 is depicted by an oval around the section 185. In another embodiment, the second thumbnail 170 is indicated by a first line pointer from the second thumbnail 170 to the section 185 of the image 155.

Figure 5:
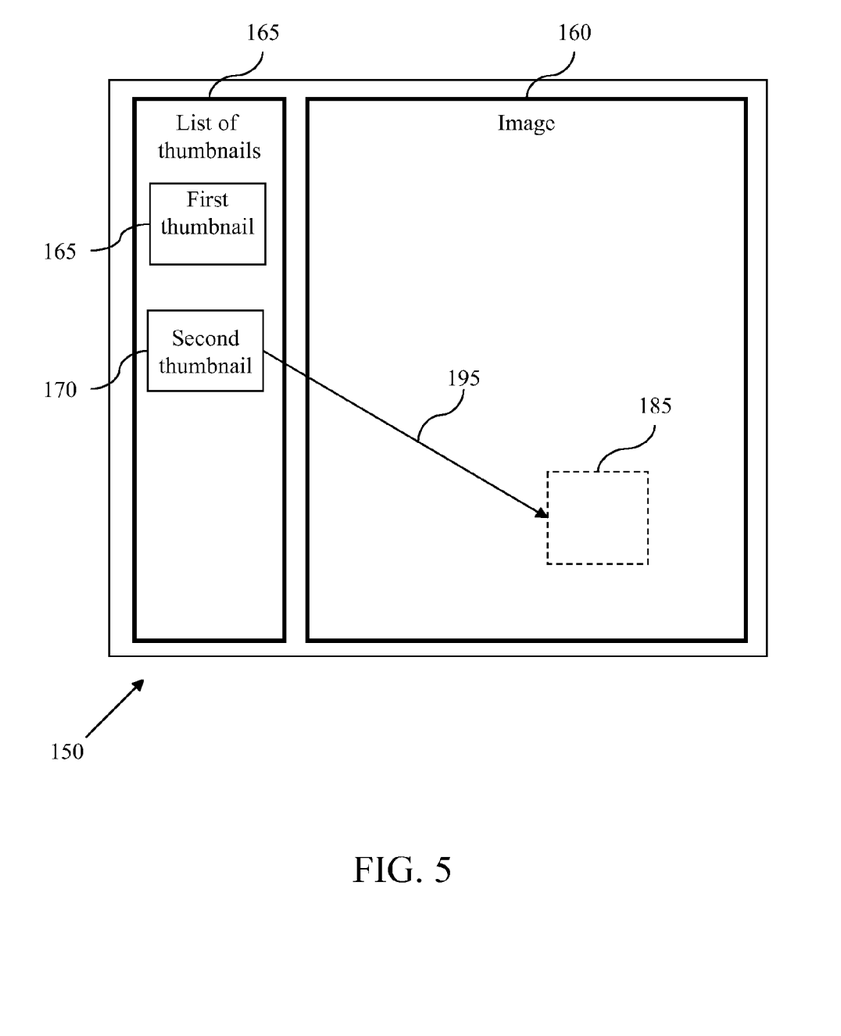
FIG. 5 is a block diagram illustrating an example display depicting indication of a second thumbnail in accordance with an embodiment of the invention.

FIG. 5 is a block diagram illustrating an example display 150 depicting indication of a second thumbnail 170 in accordance with an embodiment of the invention. In an embodiment of the invention, the first line pointer 195 points to the section 185 of the image 155 on which the edit operation is performed. For identifying the second thumbnail 170 with respect to the first thumbnail 165, the second thumbnail 170 is indicated by a second line pointer from the second thumbnail 195 to the image 185.

Figure 6:
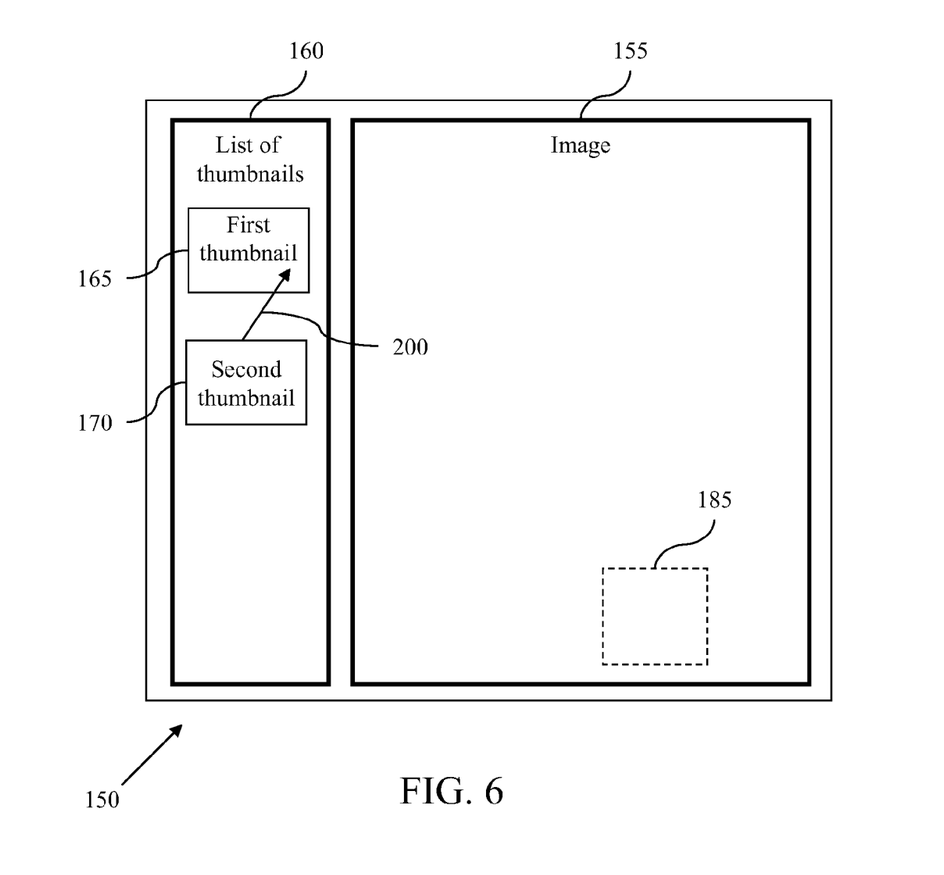
FIG. 6 is a block diagram illustrating an example display depicting identification of a second thumbnail in accordance with an embodiment of the invention.

FIG. 6 is a block diagram illustrating an example display 150 depicting identification of a second thumbnail 170 with respect to the first thumbnail 165 in accordance with an embodiment of the invention. In an embodiment of the invention, the second line pointer 200 points to the first thumbnail 165. In an alternative embodiment of the invention, the second line pointer 200 points to a point on the first thumbnail 165 that corresponds to the section 185 of the image 155 on which the edit operation has been performed. For example, that point on the first thumbnail may correspond to a specific pixel size such as 30×30. In such a case, the second line pointer 200 points to the specific point on the first thumbnail 165 that corresponds to the section 185 as represented by pixel size 30×30 of the image 155 on which the edit operation has been performed.

Figure 7:
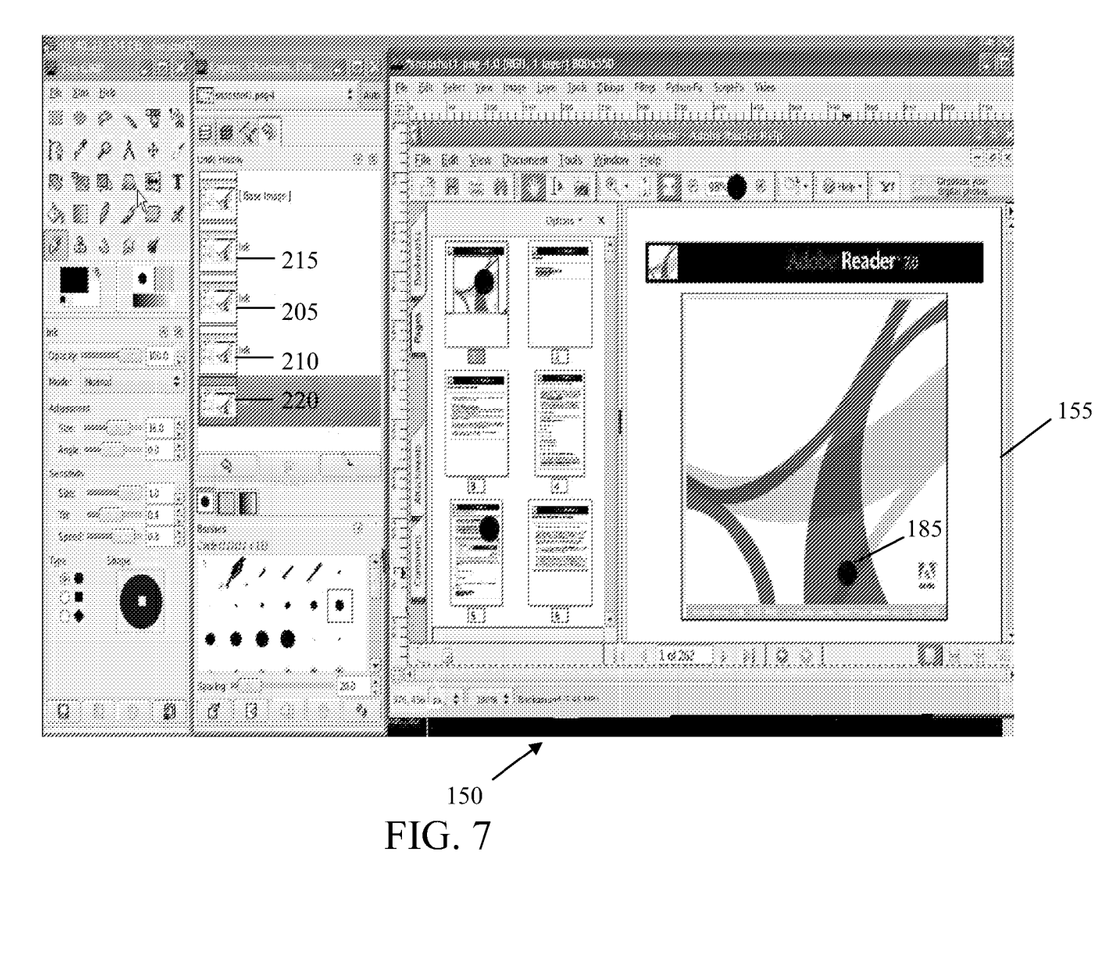
FIG. 7 is an example snapshot of a display of an existing image-editing software tool.

The embodiment of the invention described earlier will now be illustrated using example snapshots of display 150. FIG. 7 is an example snapshot of the display 150 of an existing image-editing software tool. The display 150 includes the first thumbnails 205, 210, 215, and 220. The four different first thumbnails of the image 155 are generated on use of an 'ink tool' edit operation at four different locations on the image 155. It may be observed from FIG. 7 that it is difficult to identify which first thumbnails 205, 210, 215, and 220 correspond to which versions of the image 155, and therefore locate a particular version of the image 155.

Figure 8:
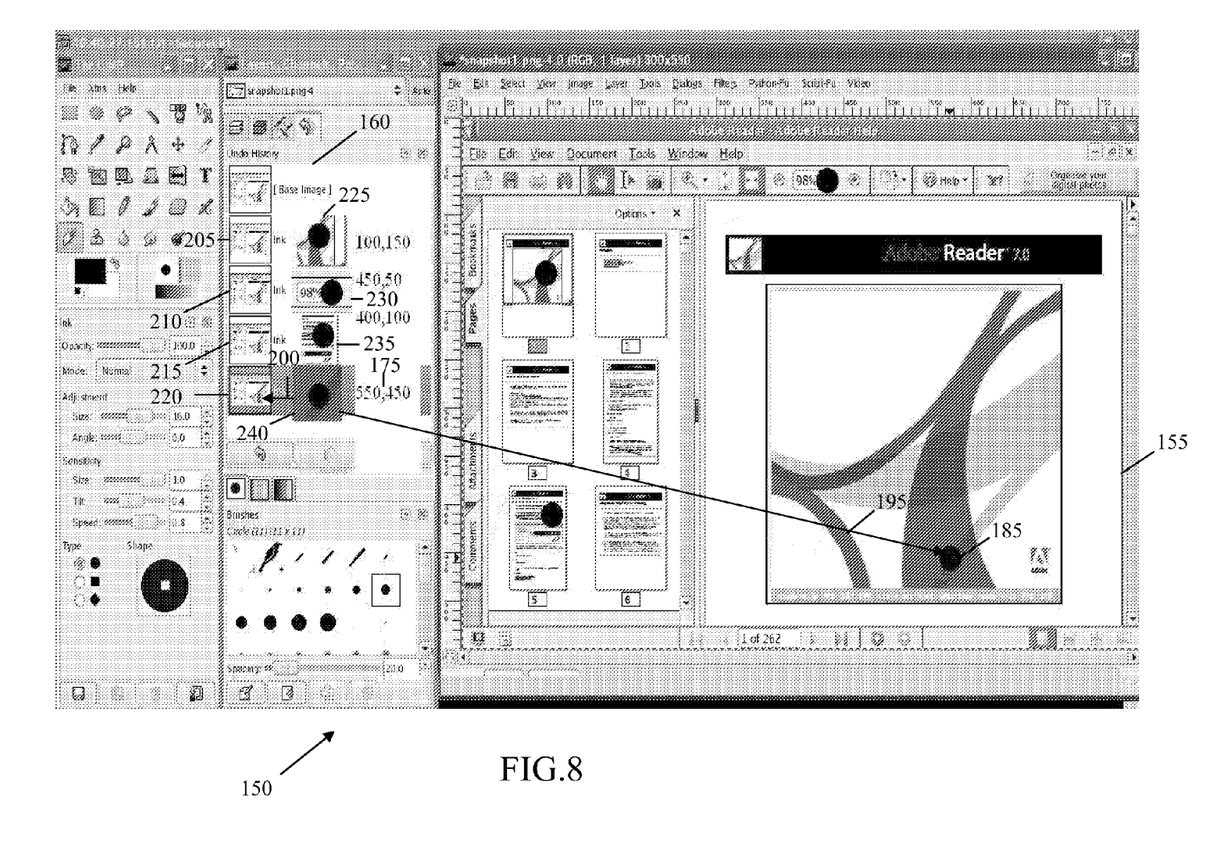
FIG. 8 is an example snapshot of a display of an image-editing software tool in accordance with embodiments of the invention.

FIG. 8 is an example snapshot of the display 150 on application of the embodiments of the invention on the image-editing software tool. The display 150 includes the list of thumbnails 160. The list of thumbnails 160 includes the first thumbnails 205, 210, 215, and 220 and corresponding second thumbnails 225, 230, 235, 240. The second thumbnails 225, 230, 235, 240 are generated upon use of the ink tool at four different locations on the image 155. The display 150 also includes the numeric values of the locations 245, 250, 255, and 260 from where the second thumbnails 225, 230, 235, 240 are generated. The first and second line pointers identify the second thumbnails 225, 230, 235, 240 with respect to the image 155 and the first thumbnails 205, 210, 215, and 220 respectively. For purposes of illustration, the first and second line pointers are shown only for the second thumbnail 240. The first line pointer 195 points from the second thumbnail 240 to the section 185 of the image 155 on which the ink tool has been used. The second line pointer 200 points to the specific point on the first thumbnail 220 that corresponds to the section 185 of the image 155 on which the ink tool has been used. It may be observed from FIG. 8 that different versions of the image 155 are clearly distinguishable through the second thumbnails 225, 230, 235, 240.

Figure 9:
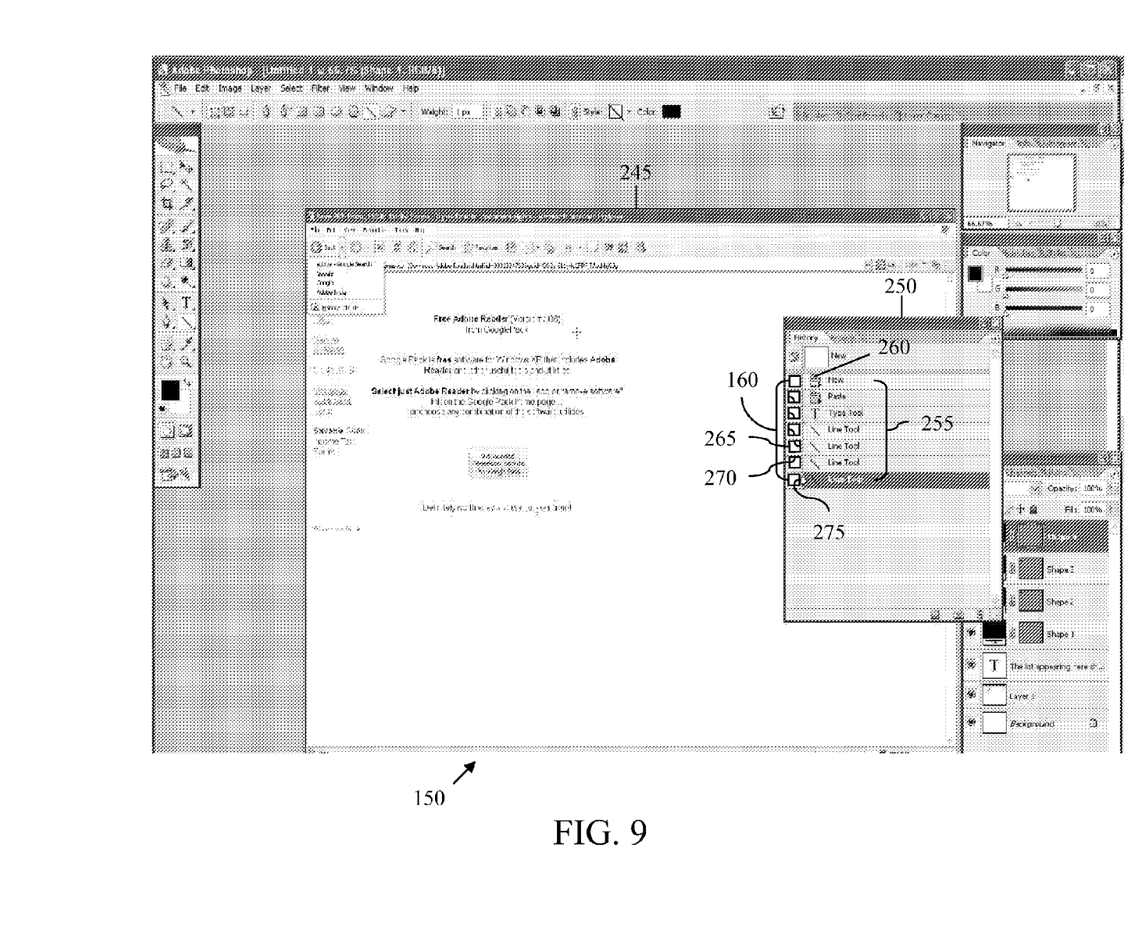
FIG. 9 is a snapshot illustrating a list of thumbnails in accordance with an embodiment of the invention.

FIG. 9 is an example snapshot of the display 150 illustrating the list of thumbnails 160 in accordance with an embodiment of the invention. The snapshot includes a navigation window 245. The navigation window 245 includes a tool description list 250. The tool description list 250 includes the list of thumbnails 160 that appears with the corresponding list of edit operations 255, and the list of icons 260. This is useful in cases where more than one thumbnail of the list of thumbnails 160 relate to similar edit operations, for example, the thumbnails 265, 270 and 275 have been created on operation of a 'line tool' on the section of the image 155. It is difficult for the user to distinguish, and therefore navigate between the different states of the image 155 by just looking at the names of the edit operations and icons. However, in embodiments of the invention the user can easily navigate between the different states by clicking on the second thumbnails, for example thumbnails 265, 270 and 275.

Figure 10:
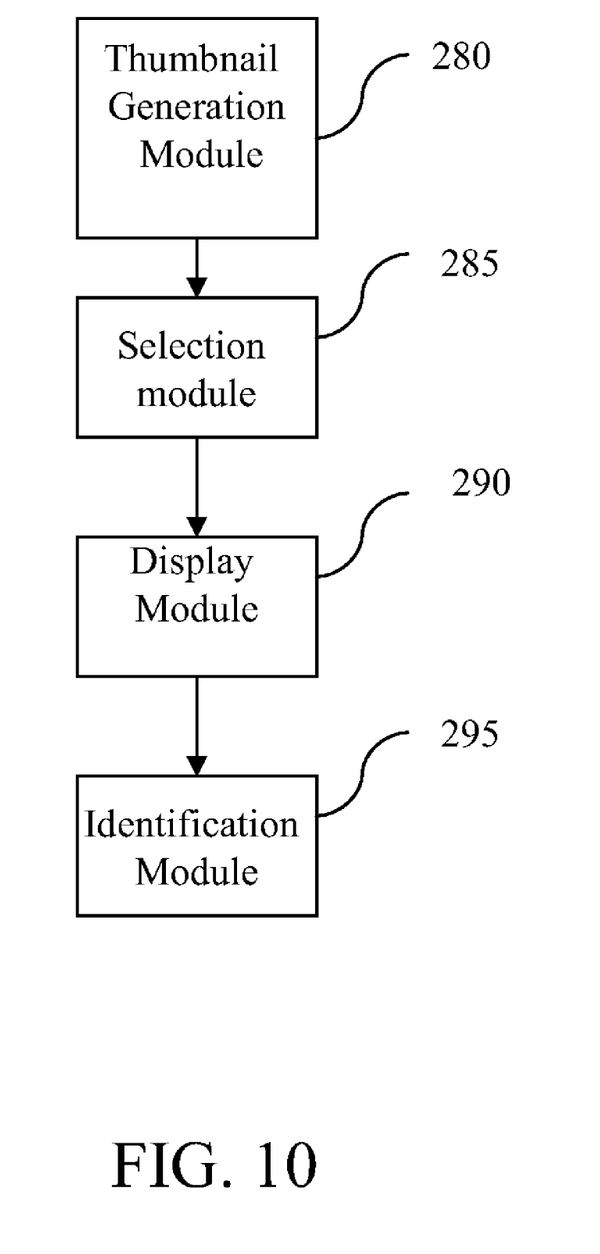
FIG. 10 is a block diagram view of an embodiment of the invention.

FIG. 10 is a block diagram view of an embodiment of the invention. In an embodiment of the invention, a thumbnail generation module 280 performs FIG. 1 step 105 of generating the first thumbnail 165 of the image 155. A selection module 285 selects the section 185 of the image 155 on which edit operations are to be performed. Thumbnail generation module 280 performs FIG. 2 step of generating the second thumbnail 170 of the image 155. In an embodiment of the invention, a display module 290 displays the first and second thumbnails. An identification module 295 identifies the second thumbnail 170 in relation to the first thumbnail 165 of the image 155.

Embodiments of the invention make edits on the image clearly visible especially in instances where a user performs more than one operation of a type at different locations on the image. Also, it becomes easy for the user to identify that version of the image which he or she desires to work on. Embodiments of the invention can be incorporated into image-editing software tools such as Adobe® Photoshop®.

The method for generating thumbnails, as described herein can be implemented using a computer system. Typical examples of a computer system includes a general-purpose computer, a programmed microprocessor, a micro-controller, a peripheral integrated circuit element, and other devices or arrangements of devices that are capable of implementing the steps that constitute the method of the invention.

The computer system comprises a computer, an input device, a display unit and the Internet. The computer further comprises a processor. A 'processor' includes any human, hardware and/or software system, mechanism, or component that processes data, signals, or other information. Processing need not be limited to a geographic location, or have temporal limitations. For example, a processor can perform its functions in "real time," "offline," in a "batch mode," etc. Moreover, certain portions of processing can be performed at different times and at different locations, by different (or the same) processing systems. The processor is connected to a communication bus.

The computer also includes a memory. The memory may include Random Access Memory (RAM) and Read Only Memory (ROM). The computer system further comprises a storage device. The storage device can be a hard disk drive or a removable storage device such as a floppy disk drive, optical disk drive, etc. The storage device can also be other similar means for loading computer programs or other instructions into the computer system.

The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to provide input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the invention. The set of instructions may be in the form of a software program. Further, the software may be in the form of a collection of separate programs, a program module with a larger program or a portion of a program module, as in the invention. The software may also include modular programming in the form of object-oriented programming. The processing of input data by the processing machine may be in response to user commands, results of previous processing or a request made by another processing machine.

A 'computer program' may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the invention.

A 'machine-readable medium' for purposes of embodiments of the invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instruction for synchronously presenting multiple video program ID streams, such as on a display screen, or for providing for input or presenting in accordance with various embodiments of the invention.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

The invention claimed is:

1. A computer-implemented method comprising:
receiving input which indicates an edit operation performed on an image, wherein the edit operation changes one or more visual characteristics of the image, wherein the edit operation is performed on a section of the image, and wherein the section is a portion of the image that is a subset of the image;
in response to said receiving the input:
selecting the section of the image on which the edit operation was performed; and
generating a thumbnail of the image from the selected section of the image;
receiving another input which indicates another edit operation performed on the image, wherein the another edit operation is performed on another section of the image, and wherein the another section is a portion of the image that is a subset of the image;

in response to said receiving the another input:
    selecting the another section of the image on which the another edit operation was performed; and
    generating another thumbnail of the image from the selected another section of the image; and
displaying the thumbnail and the another thumbnail such that the thumbnail and the another thumbnail each represent a respective, corresponding edit state of the image.

2. The method of claim 1, wherein a shape of the section of the image is one of a rectangle, a square, or a circle.

3. The method of claim 1, further comprising:
receiving input indicating a selection of the thumbnail; and
in response to said receiving the input indicating a selection of the thumbnail, performing at least one of an undo and a redo of the edit operation.

4. The method of claim 1, further comprising:
indicating, on a visual display of the image, the position of the section of the image on which the edit operation was performed.

5. The method of claim 4, wherein said indicating comprises:
displaying one or more numerical values which represent the position of the section, wherein the one or more numerical values are expressed as pixels or points of the image.

6. The method of claim 4, wherein said indicating comprises highlighting the section on the visual display of the image, wherein said highlighting comprises displaying a boundary on the visual display of the image, wherein the boundary encloses the section.

7. The method of claim 4, wherein said indicating comprises visually displaying a first line pointer from the thumbnail to the section on the visual display of the image.

8. The method of claim 1, further comprising:
in response to said receiving the input:
    generating a first thumbnail of a full representation of the image; and
    displaying the first thumbnail.

9. The method of claim 8, further comprising:
indicating, on the first thumbnail, the position of the section of the image on which the edit was performed.

10. The method of claim 9, wherein said indicating comprises:
visually displaying a second line pointer from the thumbnail to a point on the first thumbnail, wherein the point on the first thumbnail indicates the position of the section on the first thumbnail.

11. A computer program stored on a machine-readable storage medium product storing instructions that when executed cause a programmable processor to:
receive input which indicates an edit operation performed on an image, wherein the edit operation changes one or more visual characteristics of the image, wherein the edit operation is performed on a section of the image, and wherein the section is a portion of the image that is a subset of the image;
in response to said receiving the input:
    select the section of the image on which the edit operation was performed; and
    generate a thumbnail of the image from the selected section of the image;
receive another input which indicates another edit operation performed on the image, wherein the another edit operation is performed on another section of the image, and wherein the another section is a portion of the image that is a subset of the image;
in response to said receiving the another input:
    select the another section of the image on which the another edit operation was performed; and
    generate another thumbnail of the image from the selected another section of the image; and
display the thumbnail and the another thumbnail such that the thumbnail and the another thumbnail each represent a respective, corresponding edit state of the image.

12. The computer program product of claim 11 further comprising instructions operable to:
receive input indicating a selection of the thumbnail; and
in response to said receiving the input indicating a selection of the thumbnail, perform at least one of an undo and a redo of the edit operation.

13. The computer program product of claim 11, further comprising instruction operable to:
indicate, on a visual display of the image, the position of the section of the image on which the edit operation was performed.

14. A system, comprising:
a memory; and
one or more processors coupled to the memory, wherein the memory comprises program instructions executable by the one or more processors to implement a thumbnail generation module configured to:
receive input which indicates an edit operation performed on an image, wherein the edit operation changes one or more visual characteristics of the image, wherein the edit operation is performed on a section of the image, and wherein the section is a portion of the image that is a subset of the image;
in response to said receiving the input:
    select the section of the image on which the edit operation was performed; and
    generate a thumbnail of the image from the selected section of the image;
receive another input which indicates another edit operation performed on the image, wherein the another edit operation is performed on another section of the image, and wherein the another section is a portion of the image that is a subset of the image;
in response to said receiving the another input:
    select the another section of the image on which the another edit operation was performed; and
    generate another thumbnail of the image from the selected another section of the image; and
display the thumbnail and the another thumbnail such that the thumbnail and the another thumbnail each represent a respective, corresponding edit state of the image.

15. The system of claim 14, said system further configured to:
indicate, on a visual display of the image, the position of the section of the image on which the edit operation was performed.

16. The system of claim 14, wherein a shape of the section of the image is one of a rectangle, a square, or a circle.

17. The system of claim 14, further configured to:
receive input indicating a selection of the thumbnail; and
in response to said receiving the input indicating a selection of the thumbnail, perform at least one of an undo and a redo of the edit operation.

* * * * *